(12) United States Patent
Grimm et al.

(10) Patent No.: US 9,187,061 B2
(45) Date of Patent: Nov. 17, 2015

(54) ELECTRONIC DEVICE FINDER SYSTEM

(71) Applicant: GM Global Technology Operations LLC, Detroit, MI (US)

(72) Inventors: Donald K. Grimm, Utica, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 14/057,592

(22) Filed: Oct. 18, 2013

(65) Prior Publication Data

US 2015/0109116 A1     Apr. 23, 2015

(51) Int. Cl.
| | | |
|---|---|---|
| *B60R 25/10* | (2013.01) | |
| *B60R 25/01* | (2013.01) | |
| *B60R 25/102* | (2013.01) | |

(52) U.S. Cl.
CPC ............ *B60R 25/1001* (2013.01); *B60R 25/01* (2013.01); *B60R 25/102* (2013.01); *B60R 25/1004* (2013.01)

(58) Field of Classification Search
CPC ..... G01S 11/02; G01S 13/767; G01S 5/0289; G01S 5/0294; G01S 5/12; G06K 7/0008; G06K 7/10297; G06K 7/10366; H04W 4/04
USPC ............... 340/426.18, 426.2, 426.21, 426.22, 340/426.28, 426.29, 426.35, 426.36, 447, 340/446
See application file for complete search history.

(56) References Cited

U.S. PATENT DOCUMENTS

| | | | |
|---|---|---|---|
| 7,408,446 B2 | 8/2008 | Umeo et al. | |
| 8,188,837 B2 | 5/2012 | Patenaude et al. | |
| 2003/0009855 A1* | 1/2003 | Budzynski | 16/443 |
| 2005/0099043 A1* | 5/2005 | Kim | 297/217.3 |
| 2006/0262549 A1* | 11/2006 | Schmidt et al. | 362/459 |
| 2007/0090965 A1 | 4/2007 | McCall | |
| 2009/0160211 A1* | 6/2009 | Krishnan et al. | 296/146.4 |
| 2010/0117381 A1* | 5/2010 | Sung | 292/336.3 |
| 2011/0068895 A1* | 3/2011 | Gee et al. | 340/5.67 |
| 2011/0169654 A1* | 7/2011 | Ketari | 340/687 |
| 2012/0214545 A1 | 8/2012 | Johnson | |
| 2013/0049955 A1 | 2/2013 | Hoover et al. | |
| 2013/0130674 A1* | 5/2013 | De Wind et al. | 455/420 |
| 2013/0135095 A1 | 5/2013 | Stochita | |
| 2013/0271273 A1* | 10/2013 | Oesterling | 340/426.18 |

FOREIGN PATENT DOCUMENTS

WO     WO 97/23851     7/1997

* cited by examiner

*Primary Examiner* — Daniel Previl
(74) *Attorney, Agent, or Firm* — Dierker & Associates, P.C.

(57) ABSTRACT

An electronic device finder system includes a vehicle having a door handle, a piezo switch operatively positioned within the door handle, and a signal transmitter operatively connected to the piezo switch. The piezo switch has an on state that is triggered by door handle movement, and the signal transmitter is to generate a signal in response to detection of the on state of the piezo switch. An electronic device, selected from the group consisting of a key-fob and a mobile device, includes a signal receiver to receive the signal from the signal transmitter and an alarm system operatively connected to the signal receiver. The alarm system is to generate an alarm in response to the signal receiver receiving the signal.

17 Claims, 3 Drawing Sheets

ELECTRONIC DEVICE FINDER SYSTEM

TECHNICAL FIELD

The present disclosure relates generally to an electronic device finder system.

BACKGROUND

Vehicles often have wireless remotes that are used for controlling various vehicle functions, such as locking and unlocking doors, remotely starting the vehicle engine, and/or turning on vehicle lights. Traditional vehicle dedicated remote controls are referred to as key-fobs. More recently, applications for mobile communications devices have been developed so that the mobile communications device can function as the vehicle dedicated remote control. While the key-fob and the mobile communications device are generally more convenient than a traditional key, these items can be easily lost or misplaced.

SUMMARY

An electronic device finder system includes a vehicle having a door handle, a piezo switch operatively positioned within the door handle, and a signal transmitter operatively connected to the piezo switch. The piezo switch has an on state that is triggered by door handle movement, and the signal transmitter is to generate a signal in response to detection of the on state of the piezo switch. An electronic device, selected from the group consisting of a key-fob and a mobile device, includes a signal receiver to receive the signal from the signal transmitter and an alarm system operatively connected to the signal receiver. The alarm system is to generate an alarm in response to the signal receiver receiving the signal.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

An example of the electronic device finder system includes a vehicle and an electronic device (e.g., a key-fob or a mobile communications device, such as a smart phone). The vehicle includes a door handle assembly that is capable of selectively communicating with the electronic device using a short range wireless communication or a cellular communication. Very generally, in examples of the system disclosed herein, vehicle door handle activation triggers an alarm on the electronic device. The system may be used to find a lost or misplaced electronic device, or to inform a user of the electronic device of a potential unauthorized vehicle entry.

Figure 1:
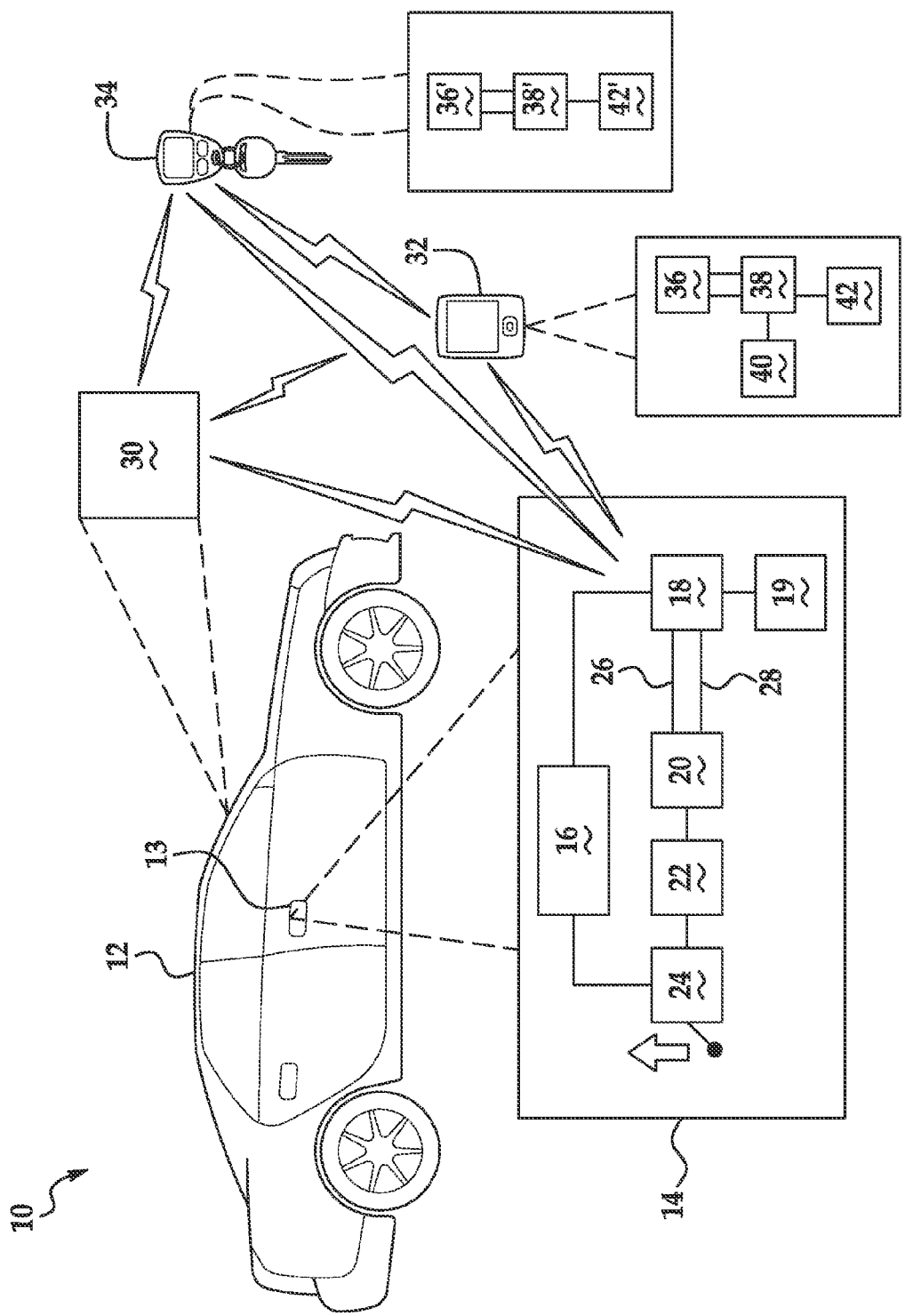
FIG. 1 is a schematic diagram depicting an example of an electronic device finder system.

Referring now to FIG. 1, an example of the electronic device finder system 10 is depicted. The system 10 includes the vehicle 12, the door handle assembly 14, and the electronic device, which is shown as mobile communications device 32 or key-fob 34.

In the examples disclosed herein, the electronics device 32, 34 is capable of receiving a signal from a component of the door handle assembly 14 in response to recognition, at the door handle assembly 14, that the door handle 13 has been activated. As will be discussed further below, the door handle assembly 14 includes a component (e.g., communications module 18) that is capable of communicating with the electronic device 32, 34, either using a short range wireless communication or a cellular communication.

The short range wireless communication may be a BLUETOOTH® communication or a Wi-Fi™ or Wi-Fi™ Direct communication.

For the BLUETOOTH® communication (which may be, e.g., BLUETOOTH® 4.0, BLUETOOTH® Low Energy, BLUETOOTH® SMART, etc.), the communications module 18 may utilize a pre-shared wireless connection key to establish a short range wireless connection with the electronic device 32, 34. The wireless connection key may be a security code or password of the communications module 18 that is generated during an initial pairing (e.g., BLUETOOTH® pairing) of the communications module 18 and the electronic device 32, 34. It is to be understood that the electronic device 32, 34 also generates its own wireless connection key (which may be a unique media access control (MAC) identifier). The communications module 18 monitors for the presence of the electronic device 32, 34 using a short range wireless antenna (not shown), and attempts to pair the electronic device 32, 34 with the communications module 18 upon recognizing the wireless connection key of the electronic device 32, 34. The electronic device 32, 34 and the communications module 18 are actually paired when the communications module 18 and the electronic device 32, 34 exchange wireless connection keys with each other. Pairing enables the communications module 18 and the electronic device 32, 34 to communicate typically under a secured connection. Once the communications module 18 and the electronic device 32, 34 have been initially paired, the communications module 18 can directly communicate with the electronic device 32, 34 if the electronic device 32, 34 is within the BLUETOOTH® range (e.g., which may be over 100 meters or 328 feet depending on the system implementation and surrounding environment) and a piezo switch 16 of the door handle assembly is in an ON state.

For the Wi-Fi™ or Wi-Fi™ Direct communication, the communications module 18 and the electronic device 32, 34 may connect to a wireless access point (WAP) or other Wi-Fi™ Direct client, which allows communication between the communications module 18 and the electronic device 32, 34. In these instances, respective memories of the communications module 18 and the electronic device 32, 34 may have stored therein an access point identifier (also referred to as a service set identifier (SSID)), which is a previously approved identifier that the communications module 18 and the electronic device 32, 34 may use to establish short range wireless connections with the WAP. The WAP may include one or more directional antennas that propagate a wireless signal at a predefined transmission power, and each of the communications module 18 and the electronic device 32, 34 automatically connects with the WAP (via an appropriate SSID) when within the wireless connection range of the WAP. An example of the standard range for Wi-Fi™ connections may be up to about 20 meters (i.e., about 65 feet) indoors, and a larger range outdoors (e.g., over 100 meters outdoors depending on the surrounding environment).

Cellular communications may be used when the electronic device is the mobile communications device 32. For a cellular communication, a mobile dialing number of the electronic device 32 (e.g., for ringing the device) and/or service provider information (e.g., service provider and subscriber identifier) may be transmitted to the communications module 18 for storage in a memory of thereof and for use thereby. The mobile dialing number and/or service provider information of the electronic device 32 may be transmitted to the communications module 18 after the electronic device 32 is registered or otherwise associated with the communications module 18, for example, through a website or a service center associated with the vehicle manufacturer or a vehicle electronics communication module (ECM) service provider (i.e., a telematics service provider).

In this example, the communications module 18 enables the vehicle 12 to contact the vehicle owner on the electronic device 32 via an automated voice call, or enables the vehicle 12 to indicate to the service provider that a find request or alert has occurred. The service provider will be able to inform the electronic device 32 using the cellular network communication between the service provider and the electronic device 32. An application installed on the electronic device 32 will listen for a service provider message and provide an audible, visual, and/or haptic indication if instructed to do so by the service provider.

Cellular communications may be accomplished over any two-way radio frequency wireless carrier/communication system, which can include cell tower(s), base station(s) and/or mobile switching center(s) (MSCs) (e.g., for a 2G/3G network), evolved Node B(s) (eNodeB) and evolved packet core(s) (EPC) (for a 4G (LTE) network), and/or land network (s). The architecture of the wireless carrier/communication system may be GSM (global system for mobile telecommunications), CDMA2000, UMTS (universal mobile telecommunications system), or LTE (long-term evolution).

The shorter range communications may be useful for locating the electronic device 32, 34 when it is located, for example, on the user, and the longer range communications may be useful for locating the electronic device 32, 34 when it is located around a home or business of the user, or in a parking location.

When the initiation of a communication between the communications module 18 and the electronic device 32, 34 is triggered (which is discussed further herein), the communications module 18 may be programmed to utilize a particular communication type, or to sequentially attempt all suitable communication types until a connection is established with the electronic device 32, 34. For example, when the electronic device is a key-fob 34 that is BLUETOOTH® and Wi-Fi™ enabled, but is not capable of cellular communications, the communications module 18 may be programmed i) to attempt a BLUETOOTH® connection, and ii) if the BLUETOOTH® connection cannot be made within a preset amount of time or a present number of connection attempts, to attempt a Wi-Fi™ connection. As another example, when the electronic device is a mobile communications device 32 that is capable of cellular communications, but is not BLUETOOTH® or Wi-Fi™ enabled, the communications module 18 may be programmed to transmit a cellular signal to the mobile communications device 32 or to contact the service provider as discussed above. As still another example, when the electronic device is a mobile communications device 32 that is BLUETOOTH® and Wi-Fi™ enabled, and is also capable of cellular communications, the communications module 18 may be programmed i) to attempt a BLUETOOTH® connection, ii) if the BLUETOOTH® connection cannot be made within a preset amount of time or a present number of connection attempts, to attempt a Wi-Fi™ connection, and iii) if the Wi-Fi™ connection cannot be made within a preset amount of time or a present number of connection attempts, to attempt a cellular connection (either directly with the device 32, or with the service provider who will then transmit a message to the device 32).

The programming of the communications module 18 or any other electronic component of the system 10 (e.g., the device 32, 34) may take place wirelessly (e.g., by downloading software updates), for example, by a vehicle manufacturer or a vehicle service provider (e.g., a telematics service provider). In another example, the software of the communications module 18 or other electronic component could also be re-flashed from a test tool that is connected by a dealer. It is believed that wireless reprogramming may be accomplished using a similar test tool. The reprogramming could enable different types of calibrations, for example, how the device 32, 34 should reveal itself (i.e., the type of alarm), the communication mechanism(s) to use, the reveal mechanism (e.g., single or double door handle movement, extended pull, etc.), or the like.

The vehicle 12 of the system 10 may be any car, truck, or recreational vehicle (RV) that has a handle 13.

Within the handle 13 is a door handle assembly 14, which in the example shown in FIG. 1 includes the piezo switch 16, the communications module 18, a processor 20, a DC-to-DC converter 22, and an energy harvester 24. The piezo switch 16 is in operative and direct communication with the communications module 18 and the energy harvester 24, and is in indirect communication with the processor 20.

The piezo switch 16 may be any electrical switch that includes a piezoelectric element and that is based on the piezoelectric effect. With the piezoelectric effect, electric charge is generated by the piezoelectric element in response to a stress exerted thereon, where the stress results from a force that is applied to the piezoelectric element. The force in the examples disclosed herein results from the activation of the door handle 13. The piezo switch 16 may be configured to respond to a single door handle pull/activation event, a double door handle pull/activation event, or an extended door handle pull/activation event (i.e., when the handle is held in the open position for some preset time period).

The double door handle pull or the extended door handle pull for triggering the piezo switch 16 may be desirable, in one example, for a vehicle 12 that has approach detection. For this type of vehicle 12, the door will unlock when the person approaches. In these instances, it may be undesirable to have a single door handle movement initiate the device finding steps because the single door handle will open the unlocked door and it may not be desirable to initiate steps to find the electronic device 32, 34 (e.g., the device 32, 34 may not need to be found). Lifting the door handle a second time after the door has been opened or holding the handle up for a minimum period of time would be an indicator to initiate the device 32, 34 finding steps. The double door handle pull or the extended door handle pull may also be desirable in other instances, so that the electronic device 32, 34 finding steps are not initiated each time the door handle is pulled a single time.

Examples of piezoelectric elements include piezoceramics, such as barium titanate, lead titanate, lead zirconate titanate, bismuth titanate, sodium bismuth titanate, potassium niobate, lithium noibate, sodium niobate, sodium potassium niobate, lithium tantalate, sodium tungstate, zinc oxide, bismuth ferrite, $Ba_2NaNb_5O_5$, $Pb_2KNb_5O_{15}$, etc., and piezopolymers (or piezoelectric polymers), such as polyvinylidene fluoride (PVDF), polyvinylidene difluoride (PVDS), a copolymer of P(VDF-TrFE) (i.e., poly(vinylidenefluoride-co-trifluoroethylene)), etc. Other examples of suitable piezoelectric elements include naturally occurring crystals, such as berlinite ($AlPO_4$), quartz, and the tourmaline-group minerals, and synthetic crystals, such as gallium orthophosphate or langasite ($La_3Ga_5SiO_{14}$). Yet another example of a suitable piezoelectric element includes self-assembled diphenylalanine peptide nanotubes (PNTs).

The piezo switch 16 has two states, an ACTIVE state and an ON state. In one example, the ACTIVE state is always enabled, and in another example, the ACTIVE state may be switched between being enabled or disabled.

When the ACTIVE state is disabled, the piezo switch 16 is unaffected by the movement of the door handle 13. The ACTIVE state may be disabled, for example, when a signal is sent to the piezo switch 16 from the processor 20, in response to a wireless signal received from the vehicle's electronic control module (ECM) 30. This wireless signal is transmitted from the ECM 30 to the processor 20 through the communications module 18 using an appropriate wireless communication. In one example, the wireless signal from the ECM 30 that triggers the disabling of the ACTIVE state may indicate that a driver is detected in the driver's seat in the vehicle 12. In response to receiving this wireless signal, the processor 20 may generate a signal commanding the piezo switch 16 to remain disabled, at least until another signal is transmitted thereto.

When enabled, the ACTIVE state enables the piezo switch 16 to be affected by the movement of the door handle 13. The default state of the piezo switch 16 may be the enabled ACTIVE state. The enabled ACTIVE state may also be entered (e.g., after having been disabled due to detection of a vehicle driver), for example, when another signal is sent to the piezo switch 16 from the processor 20, in response to another wireless signal received from the ECM 30, the mobile communications device 32, or the key-fob 34. In one example, this other signal may be transmitted to the communications module 18 directly from the ECM 30, the mobile communications device 32, or the key-fob 34. In another example, this other signal may be transmitted to the communications module 18 from the ECM 30, which initially receives a signal from the mobile communications device 32 or the key-fob 34. The other wireless signal(s) from the ECM 30, the mobile communications device 32, and/or the key-fob 34 may indicate that there is not an occupant in the driver's seat and that the vehicle 12 has been locked via an appropriate mechanism (e.g., a physical key, the key fob 34, the lock/unlock application on the mobile communications device 32, etc.). The enabled ACTIVE state enables the piezoelectric material to respond to the stress that results from the force that is applied as a result of door handle activation.

When in the enabled ACTIVE state, the piezo switch 16 responds to the stress exerted thereon (resulting from a single, double, or extended door handle activation) by generating electric charge. The electric charge that is generated turns the piezo switch 16 to an ON state. In the ON state, the switch's output is active. More specifically, the electric charge turns on a signal generator/transmitter 19 within the communications module 18. Switching between the various states will be further described in reference to FIG. 2.

In examples in which the ACTIVE state is always enabled, the piezo switch 16 is always affected by the movement of the door handle 13. In these examples, the single, double, or extended pull of the door handle 13 will trigger the ON state and the generator/transmitter 19 within the communications module 18 will be turned on. In some examples, the software of the communications module 18 may be programmed to i) enable the transmission of alarm triggering signal(s) when the generator/transmitter 19 is on and the communications module 18 has not received a signal from the ECM 30 indicating that an occupant is in the driver's seat, and ii) to suppress the transmission of alarm triggering signal(s) when the generator/transmitter 19 is on and the communications module 18 has received a signal from the ECM 30 that an occupant is in the driver's seat. In other examples in which the ACTIVE state is always enabled, the communications module 18 will always transmit the alarm triggering signal(s), but the electronic device 32, 34 may be configured to filter received signals and determine when the alarm should actually be generated. For example, the electronic device 32, 34 may trigger the alarm when the filtering mechanism determines that the alarm triggering signal is not accompanied by an electronic control module (ECM) signal that indicates that a driver is present in the vehicle 12. For another example, the electronic device 32, 34 may not trigger the alarm when the filtering mechanism determines that the alarm triggering signal is accompanied by an ECM signal that indicates that a driver is present in the vehicle 12.

As previously mentioned, the communications module 18 of the door handle assembly 14 includes suitable communications equipment, such as switches, switchboards, etc., modems, TCP/IP supporting equipment, and/or the like, to enable the communications module 18 to send communications to or receive communications from the ECM 30, the mobile communications device 32 and/or the key-fob 34.

The communications module 18 is equipped for both short range wireless communications and cellular communications. As such, the communications module 18 includes a cellular chipset/component and a short range wireless communication unit. The cellular chipset/component may be an analog, digital, dual-mode, dual-band, multi-mode and/or multi-band cellular phone. The cellular chipset-component uses one or more prescribed frequencies in standard analog and/or digital bands in the current market for cellular systems. Any suitable protocol may be used, including digital transmission technologies, such as TDMA (time division multiple access), CDMA (code division multiple access), and FDMA (frequency-division multiple access). The architecture of the wireless carrier/communication system may be GSM (global system for mobile telecommunications), CDMA2000, UMTS (universal mobile telecommunications system), or LTE (long-term evolution).

When performing short range wireless communications, the cellular chipset/component may operate in conjunction with the short-range wireless communication unit. Short range wireless communications include, for example, BLUETOOTH® and Wi-Fi™ as previously described. While the communications module 18 may be programmed to attempt short range wireless communication(s) first, the actual use of short-range wireless communication technology will depend, at least in part, on the distance of the vehicle 12 from the mobile communications device 32 or the key-fob 34.

The communications module 18 also includes a signal generator/transmitter 19. The signal generator/transmitter 19 works in conjunction with the cellular chipset/component and the short range wireless communication unit to transmit a generated signal to the mobile communications device 32 or the key-fob 34. The signal generator/transmitter 19 is responsive to the electric charge generated by the piezo switch 16. In other words, the signal generator/transmitter 19 is responsive to the ON state of the piezo switch 16. In particular, the electric charge generated by the piezo switch 16 energizes the signal generator/transmitter 19 to generate an RF signal (i.e., the alarm generating signal), which includes a command for generating an alarm. In some examples, the signal generator/transmitter 19 may be programmed to transmit the alarm generating signal whenever the signal is generated. In other examples, the signal generator/transmitter 19 may be programmed to transmit the alarm generating signal except when a signal is received at the communications module 18 indicating that an occupant is in the driver's seat. In one example, the RF signal may be transmitted wirelessly from the communications module 18 to a signal receiver 36, 36' of the mobile communications device 32 and key-fob 34. The direct transmission between the module 18 and the receiver 36, 36' may be used when there is sufficient energy to send the signal. Alternatively, the ECM 30 may be operatively connected to the communications module 18, and the communications module 18 may utilize the ECM 30 to transmit the RF signal to the electronic device 32, 34. In this example, the communications module 18 wakes up the ECM 30 using a short range wireless signal, and then the signal(s) may be sent from the module 18 to the ECM 30 (which is powered using the vehicle's battery supply), which routes the signals to the receiver 36, 36'. The latter example may be desirable because the communications module 18 will use less of its own power to wake up the ECM 30 than to transmit signal(s) to the electronic device 32, 34.

The signal generator/transmitter 19 may also generate and transmit another signal to the ECM 30, which is indicative of the recognition of the movement of the door handle 13. This signal can trigger the transmission of a text message from the ECM 30 to the mobile communications device 32 or to a call center or a service representative of the ECM service provider. The text message can inform the user or the ECM service provider of the attempt to enter the vehicle 12.

The communications module 18 is operatively connected to both the piezo switch 16 and the processor 20. The processor 20 may be a micro controller, a microprocessor, or an application specific integrated circuit (ASIC). The processor 20 includes hardware that is capable of executing software (i.e., computer readable code/instructions) for performing various functions of the door handle assembly 14. The computer readable code is embodied on non-transitory, tangible computer-readable media. In any of the examples disclosed herein, the computer-readable media may include any one of many physical media such as, for example, electronic, magnetic, optical, electromagnetic, or semiconductor media. More specific examples of suitable computer-readable media include hard drives, a random access memory (RAM), a read-only memory (ROM), an erasable programmable read-only memory (EPROM), or a portable CD, DVD, or flash drive.

The processor 20 can respond to signals that are transmitted to the communications module 18, for example, by transmitting command signals to instruct the piezo switch to disable the ACTIVE state or to enable the ACTIVE after it has been disabled. The processor 20 can also send signals to the communications module 18. For example, the processor 20 may run software of the signal generator/transmitter 19 in order to generate the message(s) to be sent to the electronic device 32, 34 and/or ECM 30.

The door handle assembly 14 also includes the energy harvester 24 and a DC-to-DC converter 22 that operatively connects the processor 20 to the energy harvester 24. The energy harvester 24 provides a small amount of power for low-energy electronics, such as the processor 20 and the communications module 18. The energy harvester 24 derives energy from an external source (e.g., solar power, thermal energy, wind energy, kinetic energy, etc.), and stores the energy for the small, autonomous devices (e.g., the processor 20, the DC-to-DC converter 22, and the wireless communications module 18) in the door handle assembly 14. As such, the door handle assembly is an autonomous system, which does not require an electrical interface to the vehicle systems.

The DC-to-DC converter 22 is an electronic circuit which converts a source of direct current (DC) from the energy harvester 24 from one voltage level to another that is suitable for the processor 20.

As previously mentioned, the system 10 also includes the ECM 30. The ECM 30 is the electronic control module of the vehicle 12, and thus controls the electronics associated with one or more vehicle systems. In the examples disclosed herein, the ECM 30 is also an on-board vehicle dedicated communications device that is capable of wirelessly communicating with the communications module 18, the mobile communications device 32, and/or the key-fob 34 using short range wireless technology and/or cellular technology. As such, the ECM 30 includes its own communications module, short range wireless communications unit, and cellular chipset-component.

The ECM 30 may also include its own processor, encrypted memory, navigation unit containing an electronic vehicle geographic location system, a real-time clock (RTC), a short-range wireless antenna, and/or a dual mode antenna, which services the electronic vehicle geographic location system and the cellular chipset/component. The ECM 30 may be connected to a vehicle bus system, which also enables the vehicle 12 to receive signals at the ECM 30 from various units of equipment and systems both outside the vehicle 12 and within the vehicle 12.

The system 10 also includes the electronic device, which may be the mobile communications device 32 or the key-fob 34. The mobile communications device 32 may be a mobile phone or smart phone. Many configurations of the key-fob 34 may be used in examples disclosed herein. The key-fob 34 may be configured with one or more buttons configured to allow the user (via pressing one or more of the buttons) to actuate and/or access one or more components and/or systems of the mobile vehicle 12. For example, two buttons are shown on the key-fob 34 in FIG. 1 which may be configured, for example, to actuate a door lock/unlock function, to actuate a trunk opening function, to sound a panic alarm, etc. The key-fob 34, in some instances, may also be configured to turn on the ignition of the vehicle 12.

Each of the mobile communications device 32 and the key-fob 34 may also include a display screen (as shown in FIG. 1). The display screen may be used, among other things, to present a visual alarm to the user. Examples of the display include a VFD (Vacuum Fluorescent Display), an LED (Light Emitting Diode) display, a radio display, an arbitrary text device, an LCD (Liquid Crystal Diode) display, and/or the like.

As mentioned above, each of the mobile communications device 32 and the key-fob 34 includes a respective signal receiver 36, 36'. The signal receivers 36, 36' may be capable of operating in different modes (e.g., short range wireless communication mode(s) for either device 32 or 34 and/or cellular communication mode for the device 32). The signal receivers 36, 36' continuously listen for radio transmissions in the band(s) associated with the mode(s). When the signal generator/transmitter 19 transmits a signal, if the signal is within the band(s) of the mode(s) that the signal receiver 36, 36' is capable of receiving, the signal will be received and decoded (if the signal had been encoded by the signal generator/transmitter 19). The signal is then transmitted to the processor 38, 38' for analysis and response.

Each of the processors 38, 38' is similar to processor 20. The processors 38, 38' run computer readable code that analyzes the received signal and, in some instances, generates a command signal to be sent to the alarm system 42, 42' operatively connected to the processor 38, 38'. As mentioned above, in some examples, the processor 38, 38' may be configured to run computer readable code for filtering through the received signals and determining whether or not the alarm should be generated. For example, if an alarm generating signal is received with another signal indicating that an occupant is in the vehicle driver seat, the processor 38, 38' may not generate the command signal.

In response to the command signal from the processor 38, 38', the alarm system 42, 42' may be configured to generate an auditory alarm, a visual alarm, a haptic vibration alarm, or combinations thereof. The auditory alarm may include, e.g., a beep, an audible message, a substantially continuous sound/tone, a ringtone, or the like. In some examples, the auditory alarm may vary, depending upon the distance the mobile communications device 32 or key-fob 34 is from the vehicle 12. For example, if a BLUETOOTH® communication is used to transmit the signal (indicative of the fact that the electronic device is relatively close by), the auditory alarm may be a lower volume and/or have a certain tone pattern; and if a cellular communication is used to transmit the signal (indicative of the fact that the electronic device is further away), the auditory alarm may be a higher volume and/or have a different tone pattern. The visual alarm may include, e.g., a blinking light (e.g., blinking LED), a verbal and/or graphical message (to be displayed on the display), or the like. The haptic vibration alarm is a tactile alarm, such as vibration of the mobile communications device 32 or the key-fob 34.

The alarm system 42, 42' may be programmed to emit the alarm for a predetermined period of time or until the alarm is disengaged (e.g., by some command entered into the mobile communications device 32 or the key-fob 34 by a user). If a command is not received to disengage the alarm, the alarm system 42, 42' may be programmed to emit the alarm for a predetermined period of time, and then again at predetermined intervals until a command is received. For example, upon receiving the command signal from the processor 38, 38', the alarm system 42, 42' may be programmed to emit the alarm for 10 seconds. If no disengagement signal is received at the device 32, 34, the alarm system 42, 42' may stop emitting the alarm for some preset period (e.g., 2 seconds) and then emit the alarm again for another 10 seconds. This on/off alarm cycle may be repeated until a disengagement signal is received, until a preset time period has passed, or until a preset number of cycles have been performed.

The alarm is to assist the user in finding the lost or misplaced electronic device 32, 34.

The mobile communications device 32 may also include an application an application 40 resident in a memory thereof. The application 40 may have been downloaded to the mobile communications device 32 from an online application store. The application 40 includes computer readable code/instructions to display location information received from the key-fob 32 after the alarm is generated at the key-fob 32. In this example, the key-fob 32 is the lost or misplaced electronic device. The key-fob 32 includes a locating device (e.g., a GPS). After the alarm is generated by the alarm system 42', the processor 38' may instruct the locating device of the key-fob to transmit the then-current location to the mobile communications device 32 using short range wireless communication(s). In this example, the key-fob attempts to reveal itself through the alarm, but also uses the mobile communications device 32 in order to reveal its then-current location.

Figure 2:
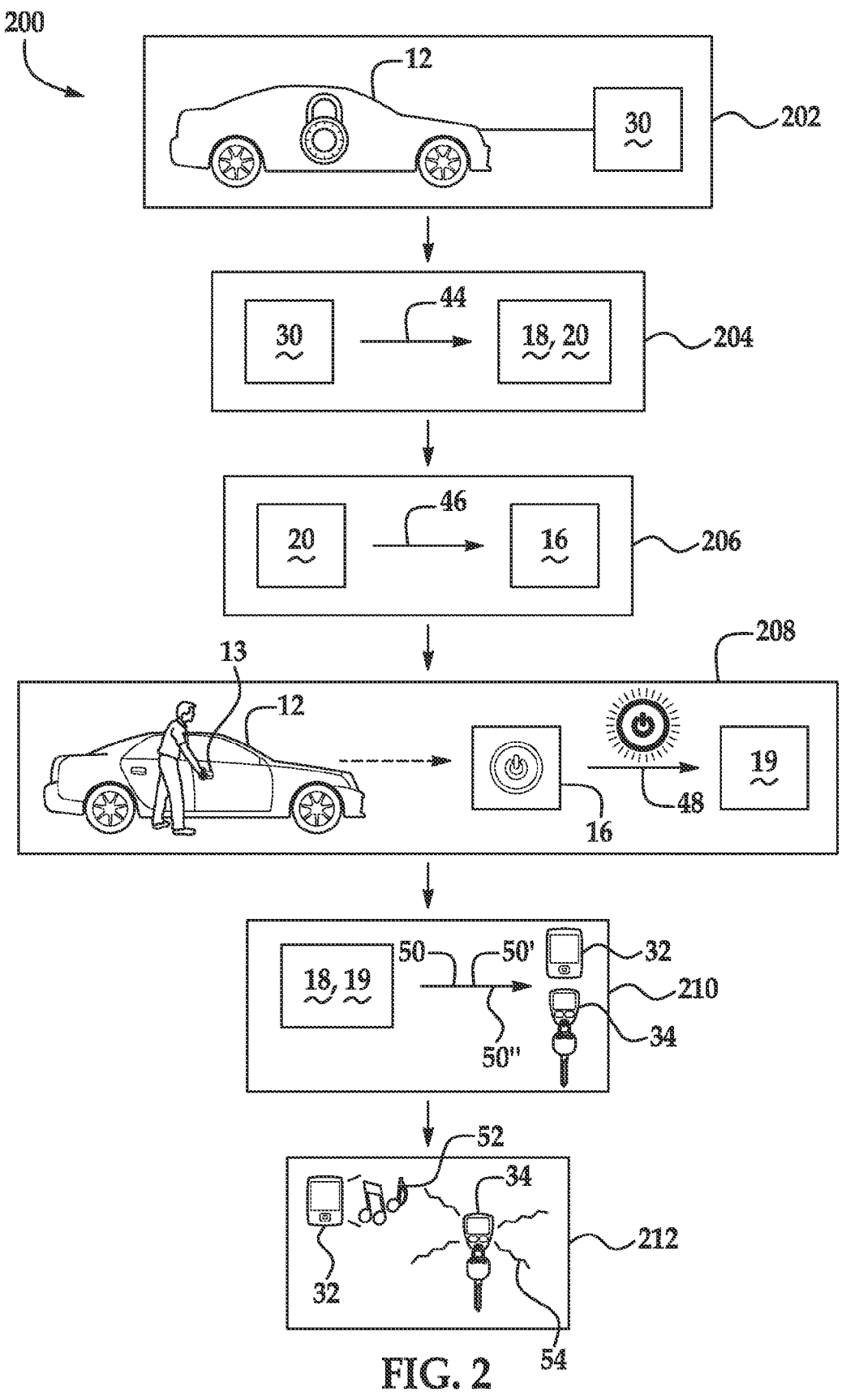
FIG. 2 is a schematic flow diagram depicting an example of a method for signaling an electronic device.

Referring now to FIG. 2, one example of the method 200 for signaling the electronic device 32, 34 is depicted. Variations of the method 200 are within the purview of this disclosure, and at least some of the variations have been described in reference to FIG. 1.

As shown at reference numeral 202, the ECM 30 locks the vehicle 12 in response to a signal from the key-fob 34, the mobile communications device 32, or a physical key. As shown at reference numeral 204, the ECM 30 then transmits a wireless signal 44 to the communications module 18, and ultimately the processor 20. This signal 44 informs the door handle assembly that the vehicle 12 has been locked and that the driver's seat of the vehicle 12 is not occupied.

In response to receiving this wireless signal 44, the processor 20 generates a signal 46 commanding the piezo switch 16 to enter the enabled ACTIVE state. This is represented at reference numeral 206. As previously discussed, the enabled ACTIVE state enables the piezo switch 16 to be affected by the movement of the door handle 13. In other examples of the method in which the piezo switch 16 is always in the enabled ACTIVE state, these steps 202-206 of the method may be eliminated because the piezo switch 16 is already in a responsive mode and does not need to be enabled.

The user (shown in the box labeled 208) has lost or misplaced the electronic device 32, 34. As illustrated at reference numeral 208, the user lifts the door handle 13 (once, twice, or for some extended time) in order to activate the door handle assembly 14 and to switch the piezo switch 16 from the ACTIVE state to the ON state (illustrated by the symbol ⏻). The movement of the door handle 13 places a force on the piezoelectric element within the switch 16, which exerts stress on the element causing it to generate electric charge 48.

The electric charge 48 wakes up or turns on the signal generator/transmitter 19 of the communications module 18 (this is also shown at reference numeral 208). The signal that is generated to activate the alarm system 42, 42' may then depend upon the communication methods that the module 18 (i.e., alone or through the ECM 30) and device 32, 34 are capable of using.

In one example, the signal generator/transmitter 19 works in conjunction with the short range wireless communication unit of the communications module 18 to generate a scan for a previously paired device (i.e., the lost or misplaced device 32, 34) or an available wireless access point (WAP) (to which the device 32, 34 may also be connected). If a paired device (which is monitoring the short range wireless band) is found during the scan, the signal generator/transmitter 19, in conjunction with the communications module 18, will iterate a connection and will transmit a signal 50 to the paired device 32 or 34, as shown at reference numeral 210. If the WAP is found, the communications module 18 automatically connects with the WAP and, in conjunction with the signal generator/transmitter 19, will iterate a connection and transmit a signal 50' to the device 32 or 34 over the Wi-Fi™ network, also as shown at reference numeral 210. In another example, the communications module 18 could transmit a signal to the ECM 30, requesting that the ECM 30 wake up and perform the desirable scan. The use of the ECM 30 may be desirable for performing more sophisticated or higher strength scan methods.

In another example, the signal generator/transmitter 19, in conjunction with the communications module 18, will transmit a signal 50" to the device 32 or 34 using a cellular communication. This signal transmission is also represented at reference numeral 210.

As previously mentioned, the communications module 18 may be programmed to transmit the signal 50, 50', or 50"

using a particular communication technology, or it may be programmed to cycle through all available communication technologies until the signal 50, 50', or 50" is able to be delivered to the electronic device 32, 34.

While not shown, it is to be understood that the signal 50, 50', or 50" is received by the receiver 36, 36'. In response to receiving the signal 50, 50', or 50", the processor 38, 38' analyzes the signal and, in some instances, commands the alarm system 42, 42' to generate an alarm. The generation of the alarm is shown at reference numeral 212, where the mobile communications device 32 emits and audible alarm 52 and the key-fob 34 emits a vibration or visual alarm 54. The alarm is believed to assist the user in finding the lost or misplaced electronic device.

Figure 3:
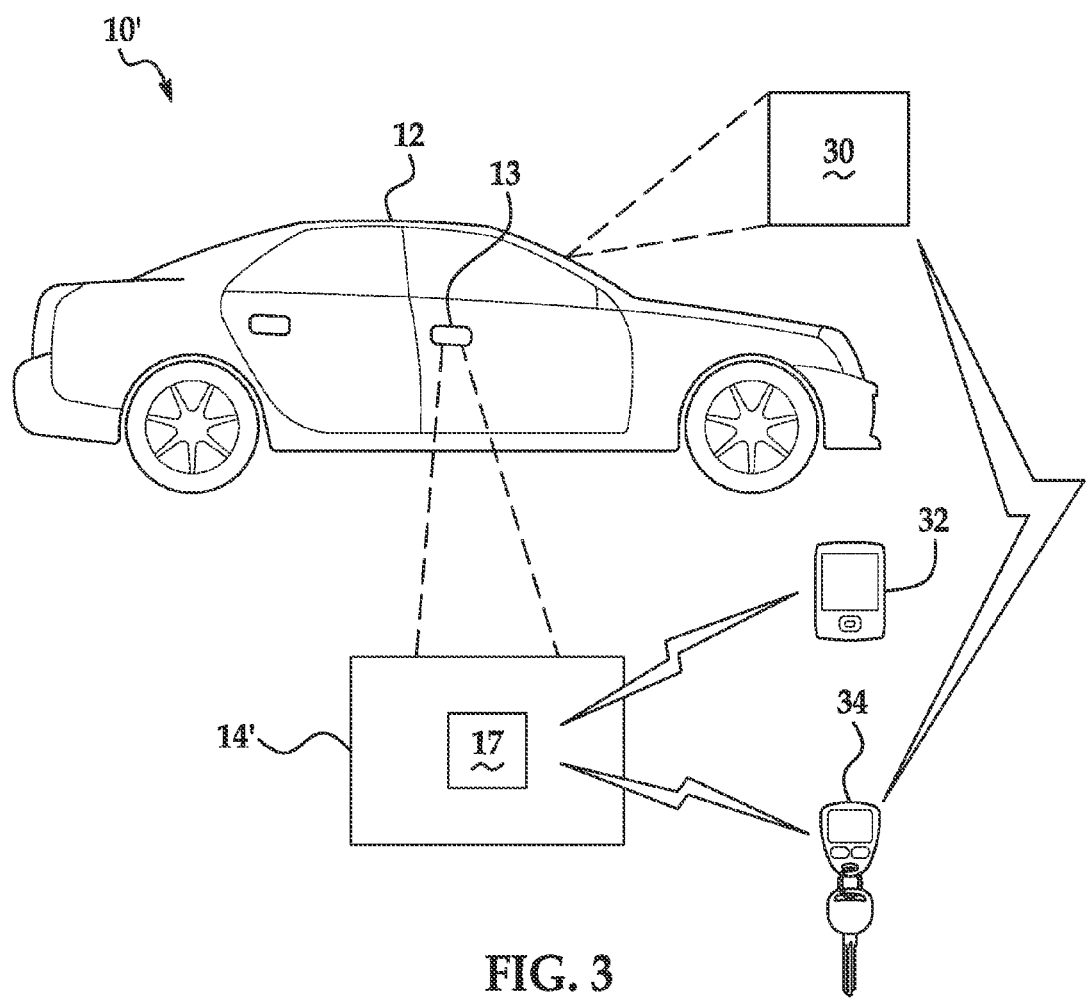
FIG. 3 is a schematic diagram depicting another example of the electronic device finder system.

Referring now to FIG. 3, another example of the system 10' is illustrated. This system 10' is similar to the system 10, except that it utilizes the mobile communications device 32 to initiate steps to find the key-fob 34.

In this example, the door handle assembly 14' includes a near field communication (NFC) chip 17 operatively positioned within the door handle 13. The mobile communications device 32 in selective communication with the NFC chip 17. When the mobile communications device 32 is brought within a short range wireless range of the NFC chip 17, the NFC chip 17 will be awaken and will transmit an electronic device finding option to the mobile communications device 32. This option will appear on the display screen of the mobile communications device 32, and a user can input a command (e.g., using a touch screen or key pad) to either initiate or not initiate the key-fob finder.

When the user selects to initiate finding the key-fob 34, the mobile communications device 32 will send a signal to the NFC chip 17 requesting the chip 17 to send an alarm triggering signal to the key-fob 34. Upon receiving this signal at the receiver 36', the key-fob 34 will process the signal and, in some instances, generate the alarm in accordance with any of the examples previously described. Alternatively, in response to the signal from the mobile communications device 32 initiating the finding steps, the chip 17 will send a signal to the ECM 30, which will then send an alarm triggering signal to the key-fob 34. The key-fob 32 will respond in accordance with any of the examples previously described.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Furthermore, it is to be understood that, as used herein, the term "user" includes a vehicle owner, a vehicle driver, and/or a vehicle passenger. In instances where the user is the vehicle owner, the term "user" may be used interchangeably with the terms subscriber and/or service subscriber.

Still further, the term "communication" is to be construed to include all forms of communication, including direct and indirect communication. Indirect communication may include communication between two components with additional component(s) located therebetween.

In addition, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. An electronic device finder system, comprising:
    a vehicle having a door handle;
    a piezo switch operatively positioned within the door handle, the piezo switch having an on state that is triggered by door handle movement;
    a signal transmitter operatively connected to the piezo switch, the signal transmitter to generate a signal in response to detection of the on state of the piezo switch; and
    an electronic device selected from the group consisting of a key-fob and a smart phone, the electronic device including:
        a signal receiver to receive the signal from the signal transmitter; and
        an alarm system operatively connected to the signal receiver, the alarm system to generate an alarm in response to the signal receiver receiving the signal.

2. The electronic device finder system as defined in claim 1 wherein the signal transmitter is operatively positioned within the door handle and is electrically disconnected from an in-vehicle electrical system.

3. The electronic device finder system as defined in claim 1 wherein the piezo switch includes a piezoelectric polymer.

4. The electronic device finder system as defined in claim 1 wherein the alarm is an auditory alarm, a haptic vibration alarm, a visual alarm, or combinations thereof.

5. The electronic device finder system as defined in claim 1 wherein the signal transmitter and the signal receiver are to transmit and receive, respectively, short range wireless signals, cellular signals, or combinations thereof.

6. The electronic device finder system as defined in claim 1 wherein:
    when the vehicle is locked, the piezo switch is in an active state, the active state enabling the piezo switch to enter the on state upon detection of the inertial movement; and
    when an occupant is detected in a driver seat of the vehicle, the piezo switch is in an inactive state.

7. The electronic device finder system as defined in claim 1 wherein the electronic device is the key-fob, and wherein the system further includes a mobile device in selective wireless communication with the key-fob, the mobile device having an application resident in a memory thereof, the application including computer readable instructions to display location information received from the key-fob after the alarm is generated.

8. A method for signaling an electronic device, the method comprising:
    detecting, at a signal transmitter that is operatively connected to a piezo switch that is operatively positioned within a door handle of a vehicle, an on state of the piezo switch, the on state being triggered by door handle movement;

generating, at the signal transmitter, a signal in response to the detection;

receiving, at a signal receiver of the electronic device, the signal from the signal transmitter, wherein the electronic device is selected from the group consisting of a key-fob and a smart phone; and in response to receiving the signal, generating an alarm by an alarm system of the electronic device that is operatively connected to the signal receiver.

9. The method as defined in claim 8 wherein the alarm is an auditory alarm, a haptic vibration alarm, a visual alarm, or combinations thereof.

10. The method as defined in claim 8 wherein the signal transmitter and the signal receiver are to transmit and receive, respectively, short range wireless signals, cellular signals, or combinations thereof.

11. The method as defined in claim 8, further comprising transmitting a message to a vehicle owner mobile device or a telematics service provider, the message indicating that the signal was transmitted.

12. The method as defined in claim 8 wherein the electronic device is the key-fob, and wherein the method further comprises:

in response to receiving the signal, transmitting key-fob location information from a location detection unit of the key-fob to a mobile device of a user of the vehicle; and displaying, by an application resident in a memory of the mobile device of the user of the vehicle, the key-fob location information on a screen of the mobile device of the user of the vehicle.

13. The method as defined in claim 8 wherein prior to detecting the on state of the piezo switch, the method further comprises:

recognizing that the vehicle is locked; and entering, by the piezo switch, an active state, the active state enabling the piezo switch to enter the on state upon detection of the inertial movement.

14. The method as defined in claim 8 wherein subsequent to detecting the on state of the piezo switch and prior to generating the signal, the method further comprises:

implementing a scan from the signal transmitter for an authenticated device;

identifying the electronic device as the authenticated device; and establishing a connection between the authenticated device and the signal transmitter.

15. The method as defined in claim 14 wherein the electronic device is the key-fob, and wherein the connection is a dedicated short range wireless connection having a range of about 100 meters.

16. An electronic device finder system, comprising:

a vehicle having a door handle;

a near field communication (NFC) chip operatively positioned within the door handle;

a mobile communications device in selective communication with the NFC chip and to receive an electronic device finding option from the NFC chip; and a key-fob, including:

a signal receiver to receive an alarm triggering signal from the NFC chip; and an alarm system operatively connected to the signal receiver, the alarm system to generate an alarm in response to the signal receiver receiving the alarm triggering signal.

17. The electronic device finder system as defined in claim 16 wherein the mobile communications device is to:

display the electronic device finding option on its display screen;

receive a user input to initiate finding the key-fob; and send a signal to the NFC chip requesting the NFC chip to send the alarm triggering signal to the key-fob.

\* \* \* \* \*